(12) United States Patent
Rushton et al.

(10) Patent No.: US 11,368,877 B2
(45) Date of Patent: Jun. 21, 2022

(54) SYSTEM AND METHOD FOR LOAD BALANCING TRAFFIC OVER MULTIPLE RADIO FREQUENCY BANDS FOR SELF-ORGANIZING NETWORK OPTIMIZATION

(71) Applicant: Verizon Patent and Licensing Inc., Basking Ridge, NJ (US)

(72) Inventors: Daniel Rushton, Pompano Beach, FL (US); Jacob Benjamin Spahr, Charlotte, NC (US); Alex E. Cihanowyz, Columbia, MD (US); Karen Birgbauer, Grosse Pointe Woods, MI (US); Nelson A. Del Valle, Land O Lakes, FL (US); Smitha Nagali, Plymouth, MI (US); Ryan William Corkery, Philadelphia, PA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 85 days.

(21) Appl. No.: 16/936,461

(22) Filed: Jul. 23, 2020

(65) Prior Publication Data

US 2022/0030463 A1 Jan. 27, 2022

(51) Int. Cl.
*H04W 28/08* (2009.01)
*H04W 24/08* (2009.01)
*H04W 88/08* (2009.01)

(52) U.S. Cl.
CPC ......... *H04W 28/085* (2013.01); *H04W 24/08* (2013.01); *H04W 28/0958* (2020.05); *H04W 88/08* (2013.01)

(58) Field of Classification Search
CPC ............... H04W 28/085; H04W 24/08; H04W 28/0958; H04W 88/08
See application file for complete search history.

(56) References Cited

U.S. PATENT DOCUMENTS

| 2014/0295872 A1* | 10/2014 | Chang | H04W 72/10 455/452.2 |
|---|---|---|---|
| 2018/0206133 A1* | 7/2018 | Venkatraman | H04W 4/70 |
| 2021/0084599 A1* | 3/2021 | Kim | H04W 52/143 |

* cited by examiner

Primary Examiner — Jung H Park

(57) ABSTRACT

Systems and methods relate to a Self-Organizing Network (SON) that makes changes to operating parameters for the purpose of load balancing, to increase data communication throughput and capacity. A device may determine load balancing ratios and unused throughput for a first frequency band and a second frequency band for a cell site. The device may also determine, based on the load balancing ratios and the unused throughputs, whether a load balancing procedure for the cell site should be performed to increase a traffic throughput at the cell site.

21 Claims, 12 Drawing Sheets

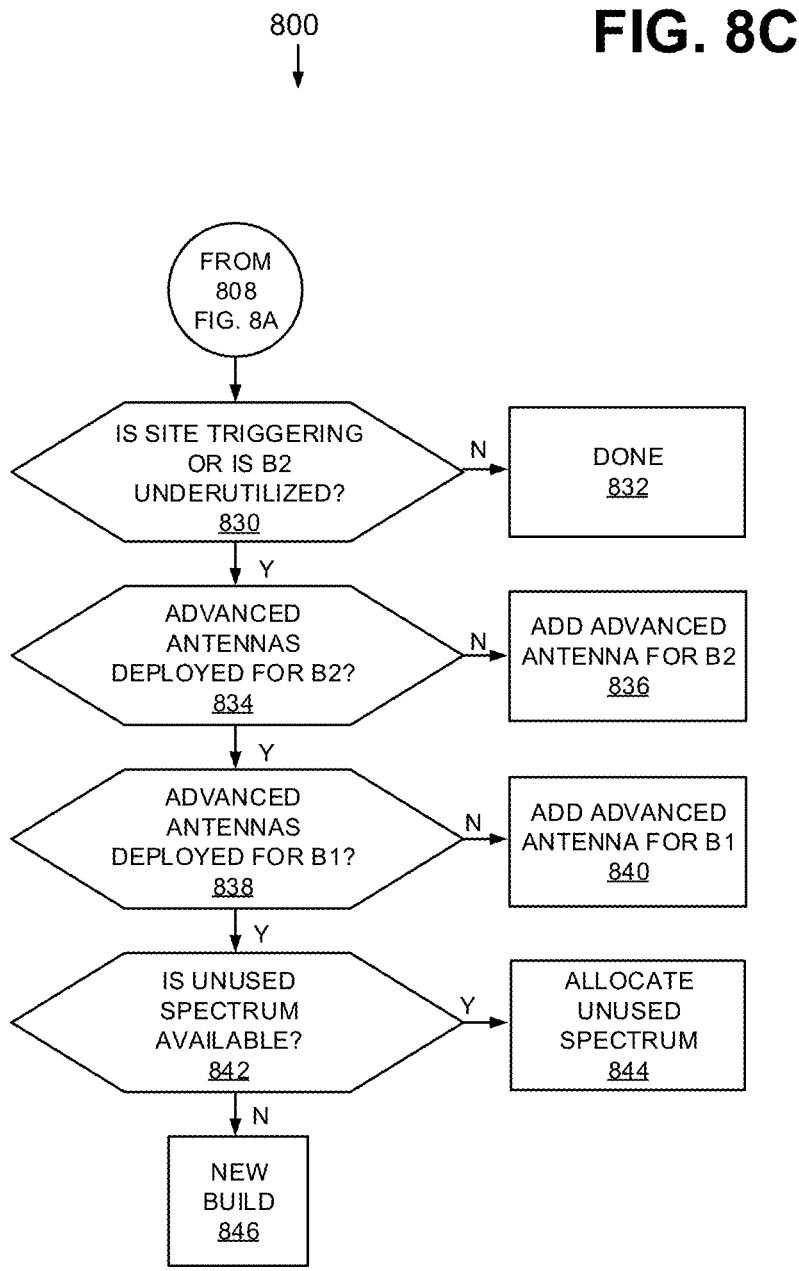

SYSTEM AND METHOD FOR LOAD BALANCING TRAFFIC OVER MULTIPLE RADIO FREQUENCY BANDS FOR SELF-ORGANIZING NETWORK OPTIMIZATION

BACKGROUND INFORMATION

Many significant improvements have been made on different types of self-organizing networks (SONs). For a network at customer premises, for example, a service provider may forward firmware updates to devices with the ability to enter a SON mode. In the SON mode, the device can represent the home network as a single local area network, and may permit mobile wireless devices to establish links to the nearest access point. For networks that service millions of wireless mobile devices, SON components are coupled to other network components in access networks, such as base stations antennas, for example, to modify their beam widths, or to apply various other optimization techniques.

BRIEF DESCRIPTION OF THE DRAWINGS

FIGS. 8A-8C are a flow diagram of an exemplary process that is associated with load balancing the access network of FIG. 1.

DETAILED DESCRIPTION OF PREFERRED EMBODIMENTS

The following detailed description refers to the accompanying drawings. The same reference numbers in different drawings may identify the same or similar elements.

The systems and methods described herein relate to a Self-Organizing Network (SON) that makes changes to operating parameters, of the SON, for the purpose of load balancing, to increase data communication throughput and capacity. Today's advanced networks employ multiple Radio Frequency (RF) bands. For example, Long-Term Evolution (LTE) networks use bands, over a range of frequencies, that can be classified as low bands (700/850 Megahertz (MHz)) or high bands (e.g., Advanced Wireless Services (AWS) around 1,710-1,755 MHz and 2,110-2,155 MHz; Personal Communications Service (PCS) around 1850-1990 MHz; etc.). Because signals at different frequencies have different path losses, they are transmitted and travel at different signal strengths. This needs to be taken into account to balance traffic loads among different bands at access networks and wireless stations. The systems and methods described herein take into consideration low-band versus high-band signal power (due to different path losses) to perform load balancing at the access network. More specifically, a Self-Organizing Network function (e.g., a component implemented within a network) calculates unused throughputs (UTPs) and load balancing ratios (LBRs) for different frequency bands for each cell site based on a number of Key Performance Indicators associated with the site. After the calculations, the SONF uses the LBRs and UTPs to determine whether it is desirable to perform load balancing at the access network. If so, the SONF performs load balancing operations based on operating parameters of the wireless station at the site.

Figure 1:
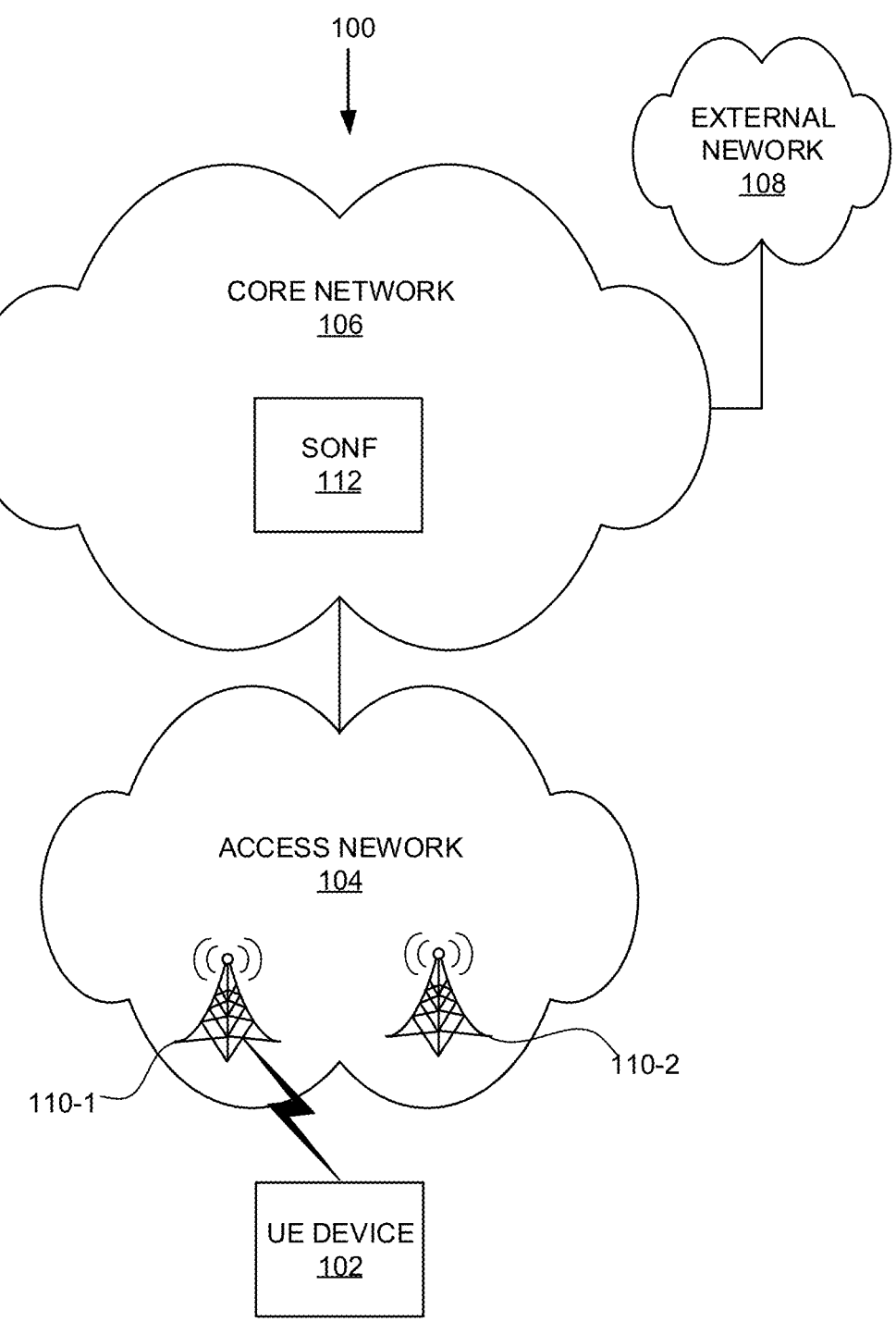
FIG. 1 illustrates an exemplary network environment in which systems and methods described herein may be implemented.

FIG. 1 illustrates an exemplary network environment 100 in which the concepts described herein may be implemented. As shown, environment 100 may include UE devices 102 (referred to as UE devices 102 or UE device 102), an access network 104, a core network 106, and an external network 108.

UE device 102 may include a wireless communication device. Examples of UE device 102 include: a smart phone; a tablet device; a wearable computer device (e.g., a smart watch); a laptop computer; a portable gaming system; and an Internet-of-Thing (IoT) device. In some implementations, UE device 102 may correspond to a wireless Machine-Type-Communication (MTC) device that communicates with other devices over a machine-to-machine (M2M) interface, such as Long-Term-Evolution for Machines (LTE-M) or Category M1 (CAT-M1) devices and Narrow Band (NB)-IoT devices. UE device 102 may send packets over or to access network 104.

Access network 104 may allow UE device 102 to access core network 106. To do so, access network 104 may establish and maintain, with participation from UE device 102, an over-the-air channel with UE device 102; and maintain backhaul channels with core network 106. Access network 104 may convey information through these channels, from UE device 102 to core network 106 and vice versa.

Access network 104 may include an LTE radio network, a Fifth Generation (5G) radio network and/or another advanced radio network. These radio networks may include many wireless stations, which are illustrated in FIG. 1 as wireless stations 110-1 and 110-2 (generically referred to as wireless station 110 and collectively as wireless stations 110) for establishing and maintaining an over-the-air channel with UE device 102.

Wireless station 110 may include a Fourth Generation (4G), 5G, or another type of wireless station (e.g., evolved Node B (eNB), next generation Node B (gNB), etc.) that includes one or more RF transceivers. Wireless station 110 (also referred to as base station 110) may provide or support one or more of the following: 4 Tx functions; carrier aggregation functions; advanced or massive multiple-input and multiple-output (MIMO) antenna functions (e.g., 8×8 antenna functions, 16×16 antenna functions, 256×256 antenna functions, etc.); cooperative MIMO (CO-MIMO) functions; relay stations; Heterogeneous Network (HetNets) of overlapping small cell-related functions; macrocell-related functions; Machine-Type Communications (MTC)-related functions, such as 1.4 MHz wide enhanced MTC (eMTC) channel-related functions (i.e., Cat-M1), Low Power Wide Area (LPWA)-related functions such as Narrow Band (NB) Internet-of-Thing (IoT) (NB-IoT) technology-related functions, and/or other types of MTC technology-related functions; Dual connectivity (DC), and other types of LTE-Advanced (LTE-A) and/or 5G-related functions. In some implementations, wireless station 110 may be part of an evolved UMTS Terrestrial Network (eUTRAN). Wireless station 110 may include Remote Electronic Tilt (RET) capability for beam steering or beam shaping. As further discussed below, wireless stations 110 (as part of access network 104) may be part of Self-Organizing Network (SON) that may be reconfigured by another component in networks 104, 106, and/or 108.

Core network 106 may include a local area network (LAN), a wide area network (WAN), a metropolitan area network (MAN), an optical network, a cable television network, a satellite network, a wireless network (e.g., a Code Division Multiple Access (CDMA) network, a general packet radio service (GPRS) network, an LTE network (e.g., a 4G network), a 5G network, an ad hoc network, a telephone network (e.g., the Public Switched Telephone Network (PSTN), an intranet, or a combination of networks. Core network 106 may allow the delivery of Internet Protocol (IP) services to UE device 102, and may interface with other networks, such as external network 108.

Depending on the implementation, core network 106 may include 4G core network components (e.g., a Serving Gateway (SGW), a Packet data network Gateway (PGW), a Mobility Management Entity (MME), etc.), 5G core network components (e.g., a User Plane Function (UPF), an Application Function (AF), an Access and Mobility Function (AMF), a Session Management Function (SMF), a Unified Data Management (UDM) function, a Network Slice Selection Function (NSSF), a Policy Control Function (PCF), etc.), or another type of core network component.

As further shown, core network 106 may include a Self-Organizing Network function (SONF) 112. Depending on the embodiment, SONF 112 may be implemented as one or more network devices and/or software (e.g., a program). SONF 112 may include logic for modifying operating parameters of access network 104, including those of wireless stations 110. As further explained below, SONF 112 may determine whether load balancing is necessary or desired based on unused throughputs (UTPs) and load balancing ratios (LBRs) that SONF 112 calculates for different frequency bands at each cell site. The calculations may be made based on a number of Key Performance Indicators associated with each site. When SONF 112 determines that load balancing needs to be performed at a site and, SONF 112 perform load balancing by issuing commands to wireless stations 110 and/or other components in access network 104.

External network 108 may include networks that are external to core network 106. In some implementations, external network 108 may include packet data networks, such as an Internet Protocol (IP) network. An IP network may include, for example, an IP Multimedia Subsystem (IMS) network that may provide a Short Messaging Service (SMS), Voice-over-IP (VoIP) service, etc.

For simplicity, FIG. 1 does not show all components that may be included in network environment 100 (e.g., routers, bridges, wireless access point, additional networks, additional UE devices, etc.). For example, FIG. 1 does not show devices or components that collect various operating parameters (e.g., traffic, jitter, delay, RF signal strengths, etc.) at each wireless station 110 and/or Key Performance Indicators (KPIs). Additionally, although SONF 112 is shown in FIG. 1 as included in core network 106, in other implementations, SONF 112 may be part of access network 104 or external network 108. That is, depending on the implementation, network environment 100 may include additional, fewer, different, or a different arrangement of components than those illustrated in FIG. 1.

Figure 2:
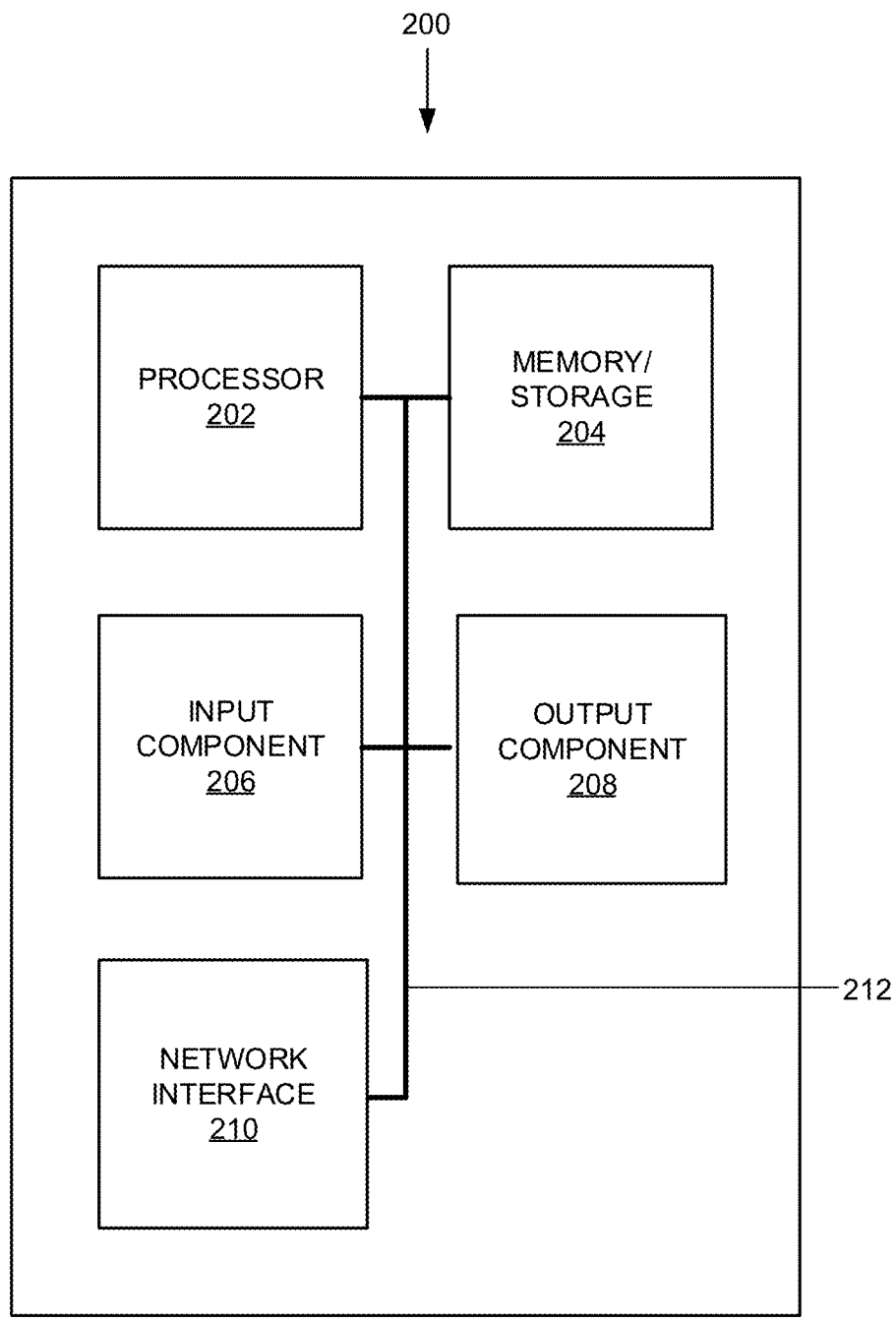
FIG. 2 depicts exemplary components of an exemplary network device of the network environment of FIG. 1.

FIG. 2 depicts exemplary components of an exemplary network device 200. Network device 200 corresponds to or is included in UE device 102, SONF 112, and any of the network components of FIG. 1 (e.g., a router, a network switch, servers, gateways, wireless stations 110, etc.). As shown, network device 200 includes a processor 202, memory/storage 204, input component 206, output component 208, network interface 210, and communication path 212. In different implementations, network device 200 may include additional, fewer, different, or a different arrangement of components than the ones illustrated in FIG. 2. For example, network device 200 may include a display, network card, etc.

Processor 202 may include a processor, a microprocessor, an Application Specific Integrated Circuit (ASIC), a Field Programmable Gate Array (FPGA), a programmable logic device, a chipset, an application specific instruction-set processor (ASIP), a system-on-chip (SoC), a central processing unit (CPU) (e.g., one or multiple cores), a microcontrollers, and/or another processing logic device (e.g., embedded device) capable of controlling device 200 and/or executing programs/instructions.

Memory/storage 204 may include static memory, such as read only memory (ROM), and/or dynamic memory, such as random access memory (RAM), or onboard cache, for storing data and machine-readable instructions (e.g., programs, scripts, etc.).

Memory/storage 204 may also include a floppy disk, CD ROM, CD read/write (R/W) disk, optical disk, magnetic disk, solid state disk, holographic versatile disk (HVD), digital versatile disk (DVD), and/or flash memory, as well as other types of storage device (e.g., Micro-Electromechanical system (MEMS)-based storage medium) for storing data and/or machine-readable instructions (e.g., a program, script, etc.). Memory/storage 204 may be external to and/or removable from network device 200. Memory/storage 204 may include, for example, a Universal Serial Bus (USB) memory stick, a dongle, a hard disk, off-line storage, a Blu-Ray® disk (BD), etc. Memory/storage 204 may also include devices that can function both as a RAM-like component or persistent storage, such as Intel® Optane memories.

Depending on the context, the term "memory," "storage," "storage device," "storage unit," and/or "medium" may be used interchangeably. For example, a "computer-readable storage device" or "computer-readable medium" may refer to both a memory and/or storage device.

Input component 206 and output component 208 may provide input and output from/to a user to/from device 200. Input and output components 206 and 208 may include, for example, a display screen, a keyboard, a mouse, a speaker, actuators, sensors, gyroscope, accelerometer, a microphone, a camera, a DVD reader, Universal Serial Bus (USB) lines, and/or other types of components for obtaining, from physical events or phenomena, to and/or from signals that pertain to device 200.

Network interface 210 may include a transceiver (e.g., a transmitter and a receiver) for network device 200 to communicate with other devices and/or systems. For example, via network interface 210, network device 200 may communicate with wireless station 110.

Network interface 210 may include an Ethernet interface to a LAN, and/or an interface/connection for connecting device 200 to other devices (e.g., a Bluetooth interface). For example, network interface 210 may include a wireless modem for modulation and demodulation.

Communication path 212 may enable components of network device 200 to communicate with one another.

Network device 200 may perform the operations described herein in response to processor 202 executing software instructions stored in a non-transient computer-readable medium, such as memory/storage 204. The software instructions may be read into memory/storage 204 from another computer-readable medium or from another device via network interface 210. The software instructions stored in memory or storage (e.g., memory/storage 204, when executed by processor 202, may cause processor 202 to perform processes that are described herein. For example, SONF 112 may be implemented as an application executed by processor 202 of network components, to make modifications to access network 104.

Figure 3:
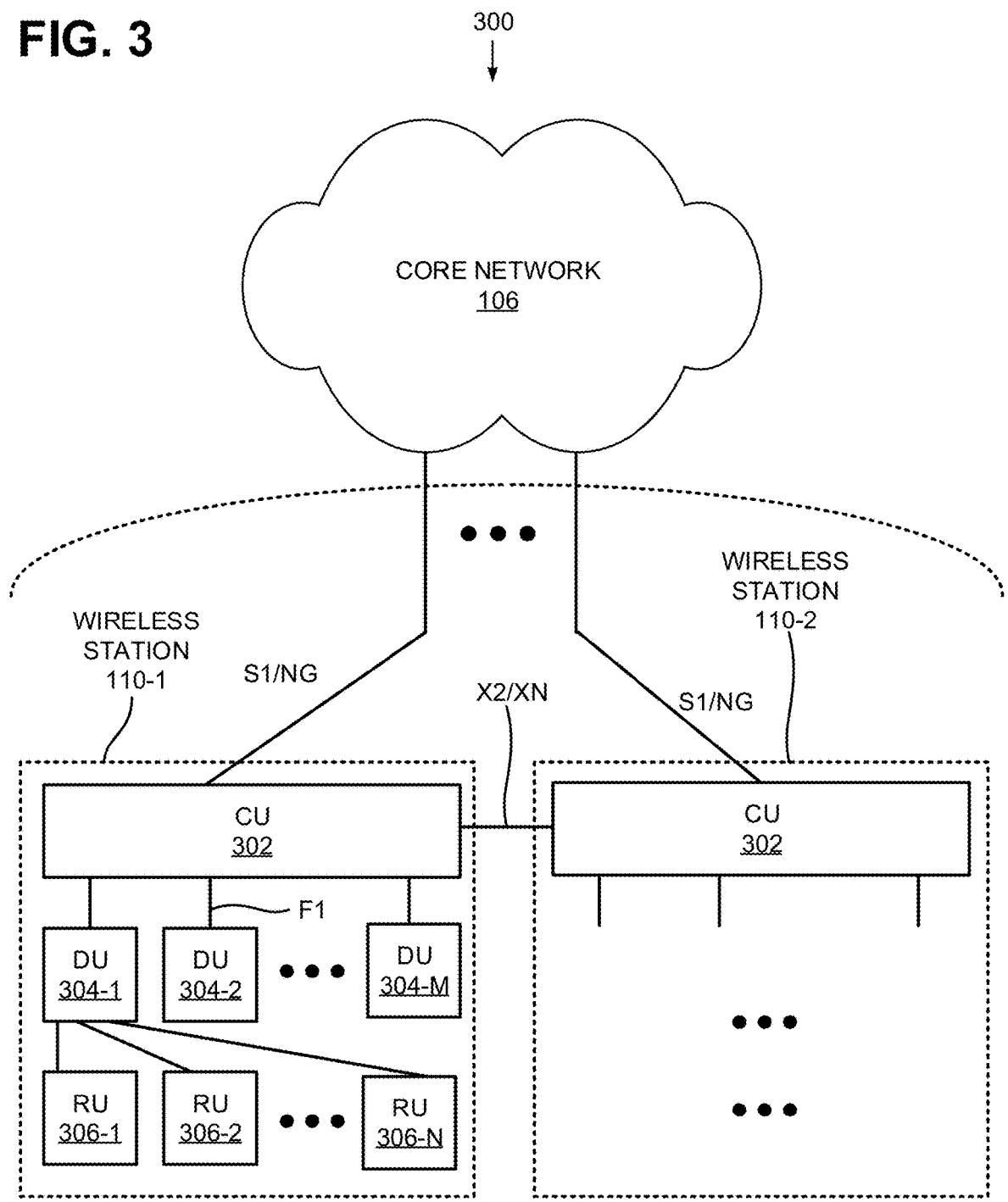
FIG. 3 illustrates exemplary logical components of the wireless stations of FIG. 1 according to one implementation.
Figure 4:
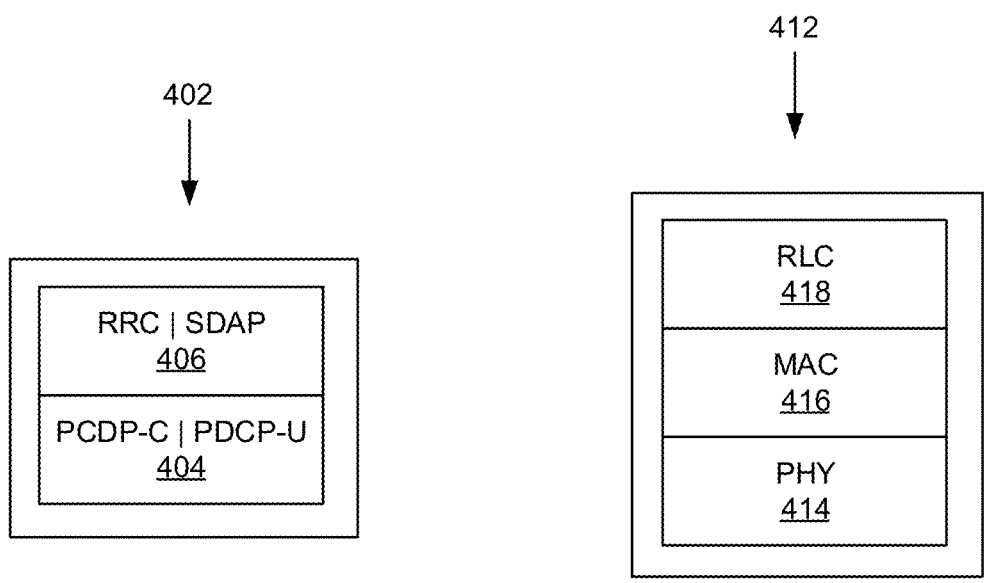
FIG. 4 illustrates exemplary communication layers at the central units, distributed units, and radio units of FIG. 3 according to one implementation.

FIG. 3 illustrates exemplary logical components of wireless stations 110 of FIG. 1 according to one implementation. Consistent with FIG. 1, wireless stations 110-1 and 110-2 are included in access network 104. Although access network 104 may include other wireless stations 110, they are not shown in FIG. 3. Each of wireless stations 110-1 and 110-2 includes a central unit (CU) 302, distributed units (DUs) 304-1 through 304-M, and, for each DU 304, one or more Radio Units (RUs) 306-1 through 306-N. For simplicity, other RUs are not shown in FIG. 3. FIG. 4 illustrates exemplary communication layers at the CUs 302, DUs 304, and RUs 306 of FIG. 3.

CUs 302 may control DUs 304 over a front haul interface. CUs 302 may manage, for example, sharing access network 104, conveying user data, mobility, sessions, etc. For each CU 302, there may be multiple DUs 304 that the CU 302 controls.

CU 302 may process upper layers 402 of the communication protocol stack for wireless stations 110. For example, assume that wireless station 110 is an eNB. As shown at FIG. 4, CU 302 may process Packet Data Convergence Protocol layer (PDCP)-Control plane|PDCP-User/Data plane 404 layer and Radio Resource Control (RRC)|Service Data Adaptation Protocol (SDAP) 406. PDCP 404 provides support to the RRC or other upper layers. More specifically, PDCP 404 may provide for transfer of user plane/control plane data, header compression, etc. RRC 406 provides for controlling radio resources, and SDAP 406 may manage the quality of service flow over the air interface.

CUs 302 may not necessarily be physically located near DUs 304, and may be implemented as cloud computing elements, through network function virtualization (NFV) capabilities of the cloud. In the particular implementation shown, CU 302 communicates with the components of core network 106 through S1/NG interface and with other CUs 302 through X2/XN interface.

DUs 304 may be controlled by CU 302. For each DU 304 in access network 104, there is only one CU 302. However, each DU 304 may send signals to multiple RU 306 for transmission, DUs 304 may handle UE device mobility, from DU to DU, from a wireless station 110 to another wireless station 110, from a cell to another cell, from a beam to another beam, etc. DUs 304 communicate with a CU 302 through F1 interface, and may process lower layers 412 of communication protocol stack for wireless station 110. DUs 304 may process, for example, from the lowest layer to the highest layer: a physical (PHY) layer 414, a Media Access Control layer (MAC) layer 416, and a Radio Link Control (RLC) layer 418. PHY layer 414 includes the physical RF signals that form radio frames; MAC layer 416 is for managing multiplexing RLC packet data, scheduling information transfer, error correction, etc.; and RLC 418 moves information from an upper layer to the radio link or from the radio link to the upper layers.

Figure 5:
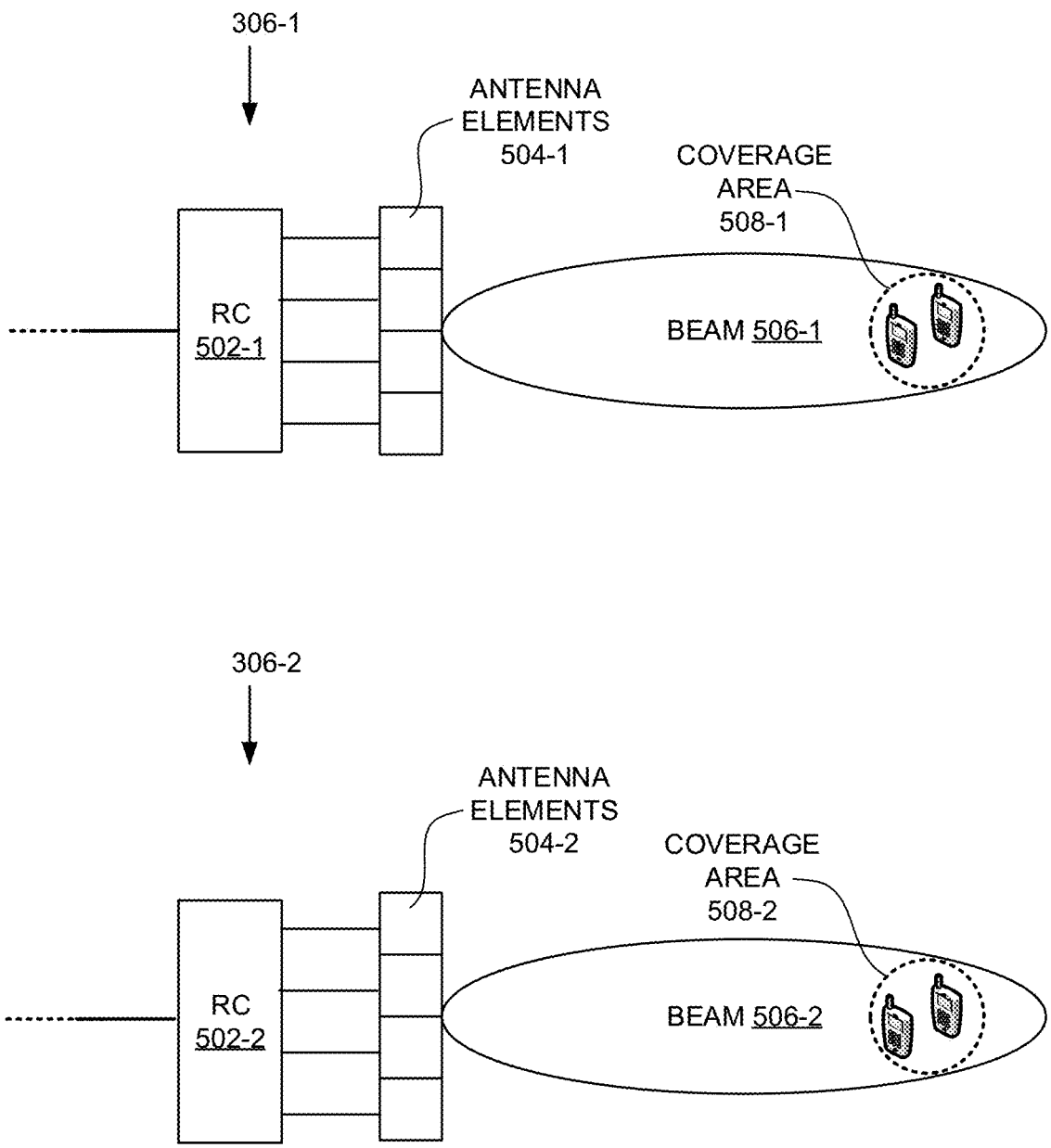
FIG. 5 illustrates exemplary logical components of the radio units of FIG. 3 according to one implementation.

FIG. 5 illustrates exemplary logical components of the radio units (RUs) 306 of FIG. 3 according to one implementation. As shown, RU 306-1 may include radio circuit (RC) 502-1 and antenna elements 504-1. RU 306-2 may include radio circuit 502-2 and antenna elements 504-2. Depending on the implementation, RU 306-1 and RU 306-2 may include additional, fewer, different, or differently arrangement of components than those illustrated in FIG. 5.

RC 502 may receive signals from DU 306, process them, and send them to antenna elements 504 for transmission. Antenna elements 504 may receive the signals and radiate the signals as a beam 506. In FIG. 5, antenna elements 504-1 are shown as forming a beam 506-1 that reaches coverage area 508-1 and, and antenna elements 504-2 are shown as forming beam 506-2 that reach coverage area 508-2.

RUs 306 in FIG. 5 are capable of controlling beam shape, beam strength, and beam directions to balance traffic load over different bands. For example, assume that beam 506-1 and beam 506-2 cover the same area. DU 304 may set a minimum transmit power level, $Q_{RX-LEV-MIN}$ at RU 306-1 for which UE devices in coverage area 508-1 may connect to wireless station 110 through beam 506-1. If SONF 112 instructs CU 302 and thus DU 304 to increase the $Q_{RX-LEV-MIN}$ for RU 306-1, the UE devices 102 in coverage area 508-1 may no longer remain connected to wireless station 110 via beam 506-1 (assuming that the signal strengths are the same). In the scenario, the UE devices 102 may then connect to wireless station 110 via beam 508-2 (which may occupy another frequency band), assuming that the $Q_{RX-LEV-MIN}$, for the corresponding RU 306-2 remains the same. Accordingly, by lowering or raising the $Q_{RX-LEV-MIN}$ at DUs 304, SONF 112 may decrease or increase the traffic load at a particular band.

In another example, assume that beams 506-1 and 506-2 cover the same area (i.e., 508-1 and 508-2 are the same) and that beam 506-1 carries more traffic than beam 506-2 by γ% (e.g., 15%). If beams 506-1 and 506-2 differ in direction by an angle X (e.g., 1 degree) beam 506-1 (which may be determined by comparing the portion of beam 506-1 with at least 3 DB power to the portion of beam 506-2 with at least 3 DB power), SONF 112 may instruct DU 304 (via CU 302) to tilt up beam 506-2, to better cover its area.

Figure 6A:
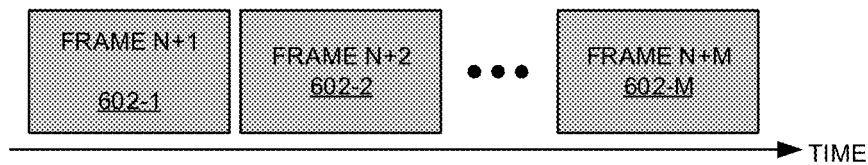
FIG. 6A illustrates exemplary radio frames transmitted from the distributed units of FIG. 3 over the radio beams of FIG. 5.

FIG. 6A illustrates exemplary radio frames 602-1 through 602-M that are transmitted from RUs 306 over beams 508 of FIG. 5 to UE devices 102. When data from DU 304 are sent over beams 508, at the physical layer, they are arranged in blocks, or otherwise known as radio frames 602. Each of frames 602 occupies a particular frequency band and spans a particular time interval, which may depend on the particular RAT used.

Figure 6B:
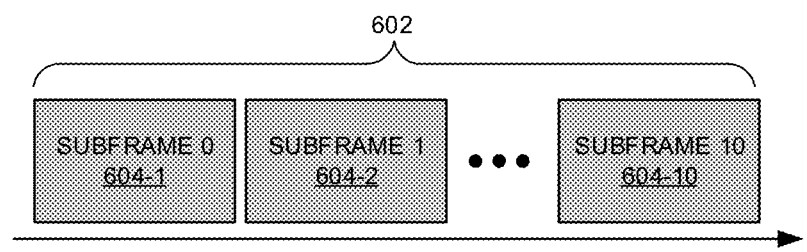
FIG. 6B illustrates exemplary sub-frames of a radio frame of FIG. 6A.
Figure 6C:
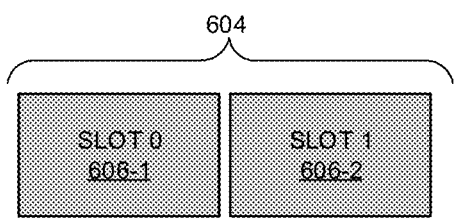
FIG. 6C illustrates exemplary components of a sub-frame of FIG. 6B.

FIG. 6B illustrates exemplary sub-frames of a radio frame 602 of FIG. 6A. As shown, each frame 602 is partitioned into ten sub-frames 604-1 to 604-10. FIG. 6C illustrates exemplary components of a sub-frame 604 of FIG. 6B. As shown, a sub-frame 604 includes two slots 606-1 and 606-2.

Figure 6D:
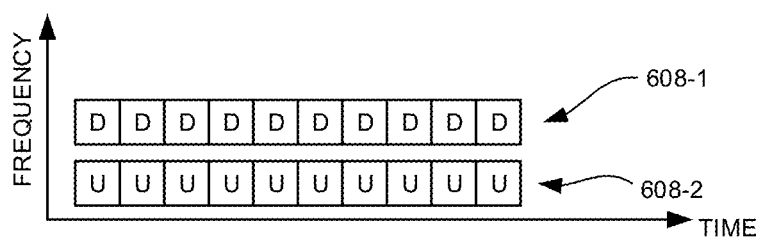
FIG. 6D illustrates exemplary sub-frames of FIG. 6C in a Frequency Division Duplex (FDD) uplink and downlink channels.
Figure 6E:
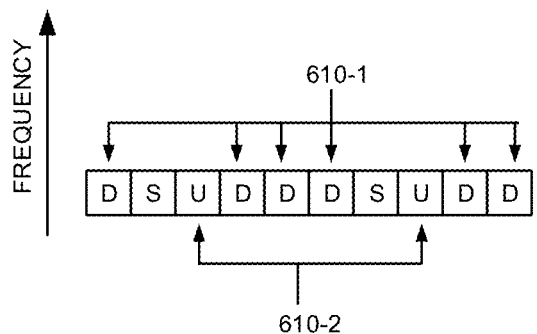
FIG. 6E illustrates exemplary sub-frames of FIG. 6C in a Time Division Duplex (TDD) uplink and downlink channels.

In FIG. 6A, in an uplink, frames 602 may be transmitted from RU 306 to UE device 102, and in a downlink, the frames 602 may be transmitted from UE device 102 to RU 306. Depending on the implementation, frames 602 in an uplink and a downlink may occupy different frequency bands or the same frequency band. For example, in the frequency division duplex mode (FDD), the uplink frames and downlink frames may occupy different frequency bands. FIG. 6D illustrates exemplary sub-frames of an FDD uplink and downlink channels. As illustrated, uplink sub-frames 608-2 (marked with letter "U") and downlink sub-frames 608-1 (marked with letter "D") occupy different frequency bands. In another example, FIG. 6E illustrates sub-frames of Time Division Duplex (TDD) uplink and downlink channels. Uplink sub-frames 610-2 (marked with "U") and downlink sub-frames 610-1 (marked with "D") occupy the same frequency band. The sub-frames marked with the letter "S" are known as special frames, and are inserted at the transition between a downlink and an uplink sub-frames.

Figure 7:
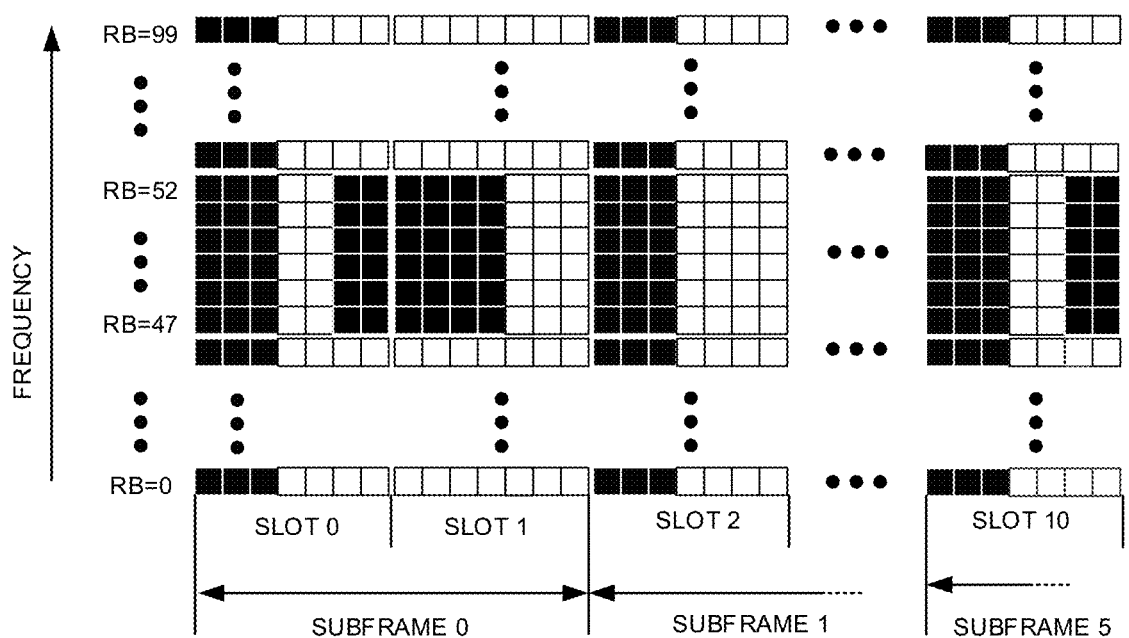
FIG. 7 illustrates an exemplary structure of a radio frame of an FDD downlink channel.

FIG. 7 illustrates an exemplary structure of a radio frame 602 of FDD downlink in greater detail. In FIG. 7, each square represents a physical resource block (PRB), which is the smallest unit of frequency and time interval that DU 304 may allocate (e.g., schedule) for transmission.

Each PRB may span a number of subcarriers (e.g., 12) in frequency and a number of Orthogonal Frequency Division Multiplex (OFDM) symbol durations in time. The spacing of the subcarriers and the symbol duration may depend on the specific RAT and its mode. For example, for LTE, the spacing between the carriers may be 15 kHz and the symbol duration may be 66.67 microseconds, although shorter symbol durations may be used. For 5G NR, the subcarrier spacing may be 15, 30, 120, or 240 kHz, and the symbol duration may be 66.67, 33.33, 8.33, 4.17 microseconds (excluding cyclic prefixes).

In FIG. 7, PRBs extend from RB=0 to RB=99 in frequency (equivalently 20 MHz) and slightly over half a frame (i.e., slightly over 10 sub-frames) in time. In the example shown, each PRB is one OFDM symbol long (although in other embodiments, a PRB may include additional symbols), each sub-frame includes 14 symbols, and each slot includes 7 OFDM symbols, assuming the standard cyclic prefix (CP). The black squares in FIG. 7 are PRBs that carry specific signals from wireless station 104 to UE device 102.

As discussed above with respect to FIG. 1, at various network devices and components as those illustrated in FIGS. 1-3 and 5 (e.g., CU 302, DU 304, RU 306, UE 102, RC 502, eNBs, gNBs, etc.), there may be monitoring components that collect KPIs/telemetry data. Examples of KPI include dropped calls, MAC bits, used/unused throughput, PRBs used, used or available bandwidths, flow information, UE device 12 communication time, etc. The obtained KPIs are accessible by SONF 112.

To load balance access network 104, SONF 112 needs not only the KPIs, however, but also operating parameters of wireless stations 110 and/or other network devices. SONF 112 may access the operating parameters from other network components that collect them, or may access them from wireless stations 110 via specific interfaces. The operating parameters may include, for example, the number of Rx and/or Tx antenna ports at RC 502 at wireless stations 110; available or used spectrum; whether each antenna is Remote Electronic Tilt (RET) capable; antenna tilts (angles in degrees) and beam widths; $Q_{RX\text{-}LEV\text{-}MIN}$ at each RU 306; etc.

In some implementations, SONF 112 may obtain a desired level of $Q_{RX\text{-}LEV\text{-}MIN}$ (herein referred to as Power Stable (PS)) for each RU 306. By setting $Q_{RX\text{-}LEV\text{-}MIN}$ to PS or other values, SONF 112 is capable of setting each DU 304 to handle a particular number of UE devices 102.

As mentioned, to determine whether load balancing is desired at a wireless station 110, SONF 112 may compute Unused Throughputs (UTPs) and Load Balancing Ratios (LBRs) for various RF bands at the wireless station 110. In computing the LBRs and UTPs, SONF 112 may use KPIs and operating parameter values at the wireless station 110.

An Unused Throughput (UTP) is computed, by SONF 112 (or another network component depending on the implementation), based on the amount of data transported over MAC layer 416 and PRBs (at PHY 412 layer), in accordance with the following:

$$\text{UTP=Empty PRBs·MAC bits per PRB} \qquad (1).$$

In expression (1), empty PRBs=Available PRB·(1−PRB Utilization %), and the MAC bits per PRB=MAC data volume/PRBs used for a given band.

A Load Balancing Ratio (LBR) for a frequency band may be computed as:

$$\text{LBR=UE device time (UET) \% in a band−Bandwidth \% (BW)} \qquad (2).$$

UET in expression (2) is defined as:

$$\text{UET=UE Devices' time utilization in the given band/Sum of all times utilized by all UE devices in the available bands} \qquad (3).$$

Bandwidth % is defined as:

$$\text{BW=Bandwidth of the given band/Sum of the bandwidths of available bands} \qquad (4).$$

Figure 8A:
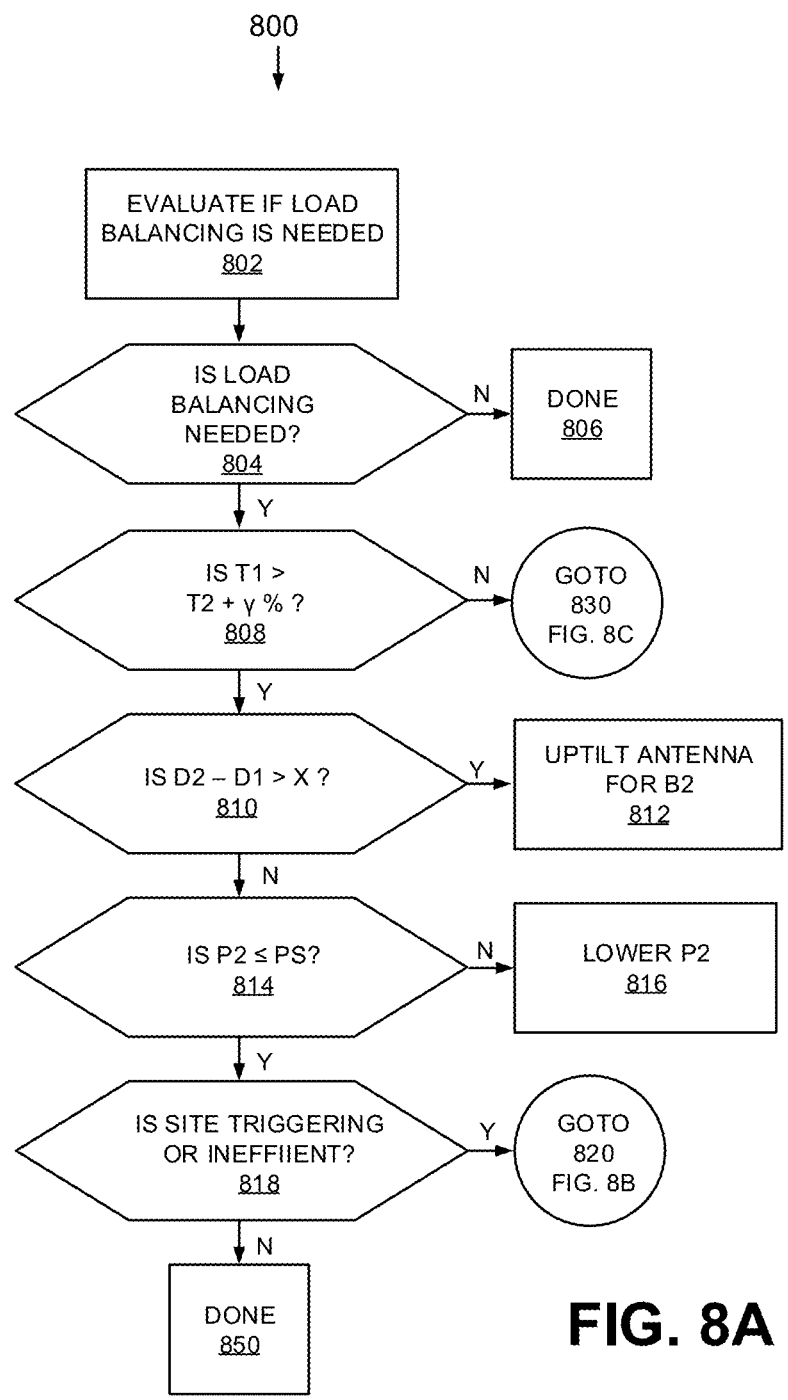
Figure 8B:
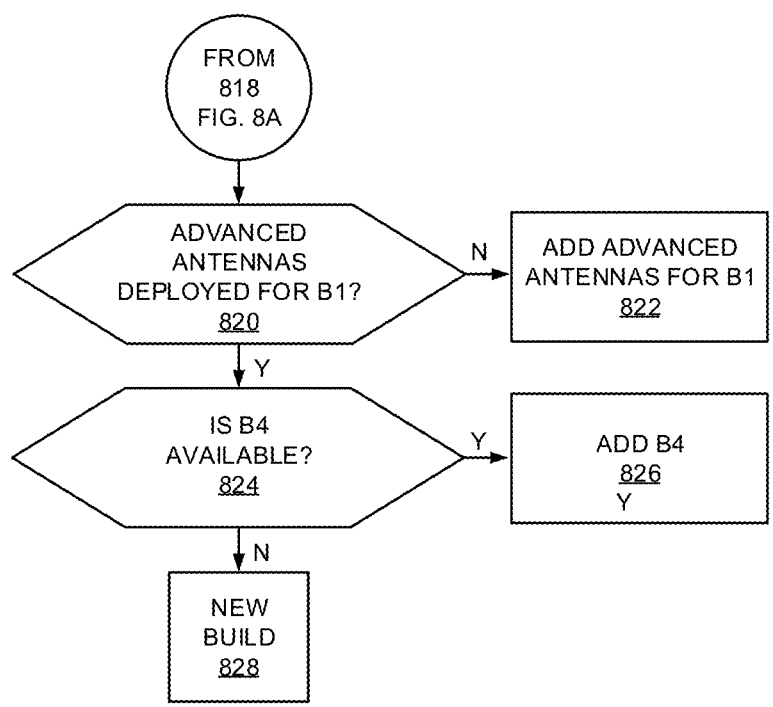

FIGS. 8A-8C are a flow diagram of an exemplary process 800 that is associated with load balancing access network 104 of FIG. 1. As indicated above, in one implementation, process 800 may be performed by SONF 112, various components of wireless stations 110, and/or UE device 102. In other implementations, process 800 may be performed by a different set of devices. For process 800, assume that B1 signifies lower frequency bands (e.g., 700 or 850 MHz), and B2 signifies higher frequency bands (e.g., AWS and PCS).

As shown, process 800 may include evaluating whether it is desirable or necessary for access network 104 to perform load balancing (block 802). In one implementation, evaluating the load balancing need may entail calculating the LBR and UTP for available bands at each site (e.g., wireless station 110-1). The specifics of using the LBRs and UTPs (in accordance with expressions (1)-(4)) to evaluate the load balancing needs at wireless station 110 are described below in greater detail with reference to FIGS. 9A and 9B.

If SONF 112 determines that no load balancing is needed/desired at wireless station 110-1 (block 804: NO), process may terminate (block 806). Otherwise (block 804: YES), SONF 112 may determine whether low band traffic (T1) (e.g., traffic in B1 (e.g., at band B3=700 and/or B4=850 MHz bands) is greater than high band traffic (T2) plus some margin amount (e.g., traffic at a band B2 (e.g., PCS or AWS)+γ % (e.g., γ=10, 12, 14, 15, 17, or any other suitable number between 0 and 100). That is, SONF 112 may determine whether T1>T2+γ % (block 808).

If T1 is not greater than T2+γ% (block 808: NO), process 800 may proceed to block 830. Otherwise (block 808: YES), SONF 112 may determine whether the tilt direction D2 of the high band antenna elements 504 are more than X degree (e.g., X=1 degree) below the tilt direction D1 of low band antenna elements 504 (block 810). That is SONF 112 may determine if D2−D1>X.

If D2−D1>X (block 810: YES), then SONF 112 may issue commands to wireless station 110 to up tilt the high band antennas by X degrees (block 812). Otherwise (block 810: NO), process 800 may proceed to block 814. At block 814, SONF 112 determines whether the current $Q_{RX-LEV-MIN}$ (referred to as P2 in block 814 of FIG. 8A) for RU 306-2 is less than or equal to than the value PS recommended by an RU monitoring component (i.e., determine whether P2≤PS) (block 814).

If P2 is greater than PS (block 814: NO), SONF 112 may instruct wireless station 110 to decrease $Q_{RX-LEV-MIN}$ to a level for the high band antenna elements to a value equal to or below PS (block 816). Otherwise (block 814: YES), SONF 112 may determine whether the site hosting DU 304 and/or RU 306 are triggering or inefficient (block 818).

If the site is neither triggering nor inefficient (block 818: NO), process 800 may terminate (block 850). If the site is triggering or is inefficient (block 818: YES), process 800 may proceed to block 820 at FIG. 8B. At block 820, SONF 112 may determine whether advanced antennas (e.g., 4 Tx antennas) have been deployed for all of the low bands (e.g., bands that are in the band B1 (e.g., 700 or 850 MHz)) (block 820).

If advanced antennas have not been deployed for all bands in B1 (block 820: NO), SONF 112 may notify the network operator to install new advanced antennas at the wireless station 110 for the low bands (block 822). However, if advanced antennas already have been deployed for all the low bands (block 820: YES), SONF 112 may determine if there is additional lower band spectrum (e.g., B4=850 MHz) available for allocation (block 824). If the spectrum is available (block 824: YES), SONF 112 may notify the network operator to install advanced antennas at wireless station 110 to loop in the spectrum (i.e., add B4) (block 826). Otherwise (block 824: NO), SONF 112 may issue a notification to the network operator that the site needs a new build (block 828).

Returning to block 808 in FIG. 8A, if T1 is not greater than T2+γ% (block 808: NO), process 800 may proceed to block 830 in FIG. 8C. At block 830, SONF 112 may determine whether the site is triggering or high bands are underutilized (block 830). If the site is neither triggering, nor the high bands are underutilized (block 830: NO), process 800 may terminate (block 832). Otherwise (block 830: YES), SONF 112 may determine if advanced antennas have been deployed for all of the high bands in B2 (e.g., AWS or PCS) (block 834).

If the advanced antennas have not yet been deployed for the higher bands at the site (block 834: NO), SONF 112 may notify the network operator to install (additional) advanced antennas at wireless station 110 for the higher bands at B2 (block 836). Otherwise (block 834: YES), process 800 may proceed to block 838, where SONF 112 evaluates whether advanced antennas have been deployed for all of the low bands at B1 (block 838). If the advanced antennas have not been deployed for all of the low bands at B1 at the site (block 838: NO), SONF 112 may notify the network operator to install (additional) advanced antennas at wireless station 110 (e.g., 4 Tx antennas) for the low band communications (block 840). Otherwise (block 838: YES), SONF 112 determines whether the site has any unused spectrum/band (block 842). If so (block 842: YES). SONF 112 may notify the network operator to add the spectrum at the wireless station 110 for use (block 844). To allocate the spectrum, the network operator may add additional advanced antennas at wireless station 110. If there is no more spectrum available at the site (block 842: NO), SONF 112 may send a notification suggesting that the site needs a new build to the network operator (block 846).

Figure 9A:
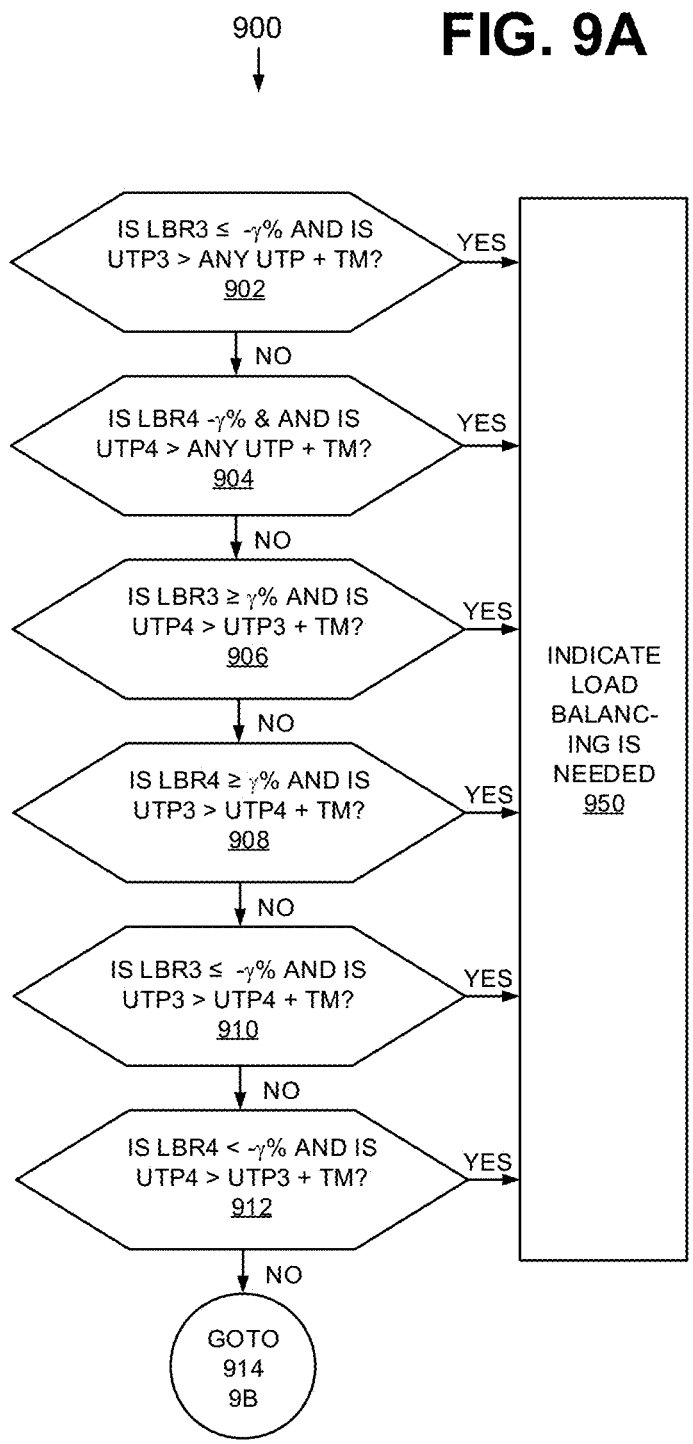
FIGS. 9A and 9B are a flow diagram of an exemplary process that is associated with determining whether the load balancing process of FIGS. 8A and 8B should be performed.
Figure 9B:
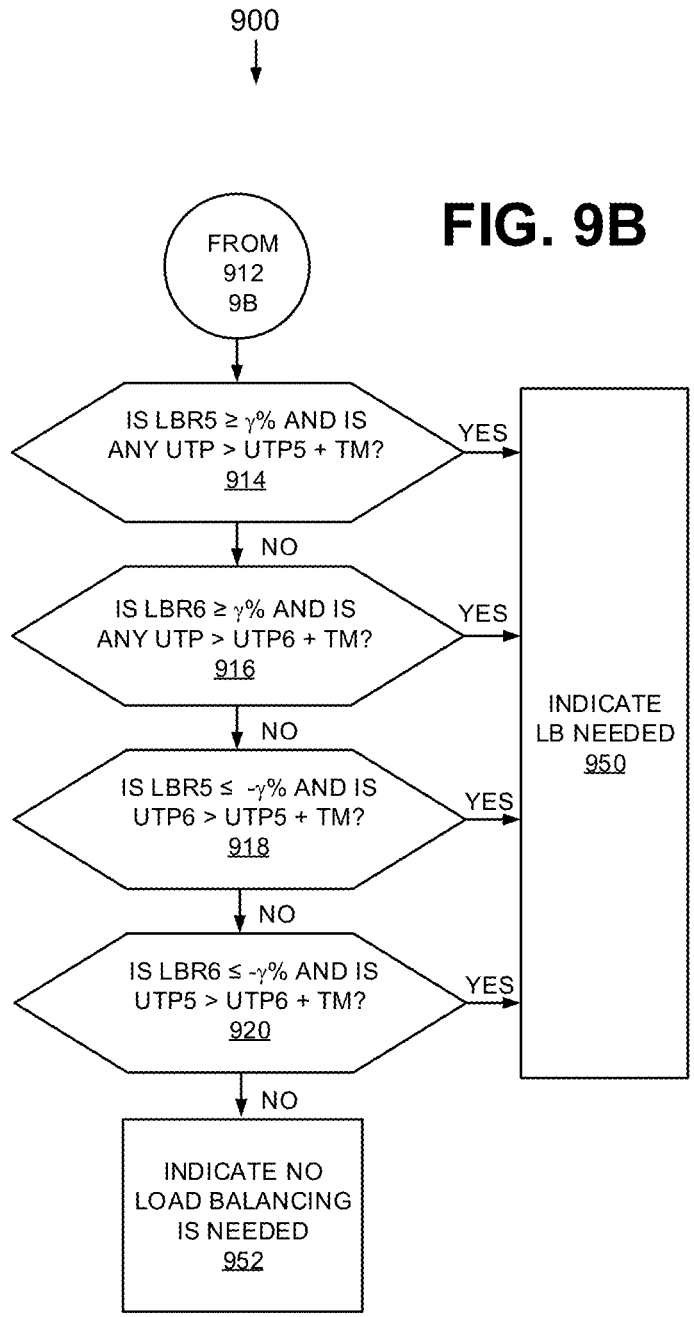

FIGS. 9A and 9B are a flow diagram of an exemplary process 900 that is associated with performing acts in block 802. Process 900 may be performed to determine whether the load balancing process of FIGS. 8A and 8B is desirable/needed. In one implementation, process 900 may be performed by SONF 112. In other implementations, process 900 may be performed by other components in external network 108 or access network 104. For process 900, assume that bands B3 (e.g., 700 MHz) and B4 (e.g., 850 MHz) are in B1 and that bands B5 (e.g., PCS) and B6 (e.g., AWS) are in B2. In addition assume that γ is a value ranging from 0-100, TM is a traffic value (e.g., 3 Mbps), and UTP1-UTP6 are Unused Throughputs (UTP) for bands B1-B6. For a given site, SONF 112 may determine load balancing ratios LBR1-LBR6 and unused throughputs UTP1-UTP6 for the bands B1-B6 in accordance with expressions (1)-(4) discussed above.

As shown, process 900 may include SONF 112 determining a LBR3 (i.e., the LBR for B3), and then determining if LBR3 is less than or equal to −γ% and UTP3 is greater than a UTP for any other bands plus TM (block 902). If the result of determining block 902 is yes, then SONF 112 may conclude that a load balancing is needed/desired (block 950). Otherwise (block 902: NO), process 900 may proceed to block 904. For example, SONF 112 may determine whether the LBR for 700 MHz band is less than −15% and the unused throughput for 700 MHz band is less than the unused throughput for any other band plus 3 Mbps.

At block 904, SONF 112 may determine if LBR4 is less than or equal to −γ% and UTP4 is greater than UTP of any other band plus TM (block 904). If the result of determining block 904 is yes, then SONF 112 may conclude that a load balancing is needed/desired (block 950). Otherwise (block 904: NO), process 900 may proceed to block 906. For example, SONF 112 may determine whether the LBR for 850 MHz band is less than −15% and the unused throughput for 850 MHz band is less than the unused throughput for any other band plus 3 Mbps.

At block 906, SONF 112 may determine if LBR3 is greater than or equal to γ% and UTP4 is greater than UTP3 plus TM (block 906). If the result of the determining at block 906 is yes, then SONF 112 may conclude that a load balancing is needed/desired (block 950). Otherwise (block 906: NO), process 900 may proceed to block 908. For example, SONF 112 may determine whether the LBR for 700 MHz band is greater than 15% and the unused throughput for 850 MHz band is greater than the unused throughput for 700 MHz band plus 3 Mbps.

At block 908, SONF 112 may determine whether LBR4 is greater than or equal to γ% and UTP3 is greater than UTP4 plus TM (block 908). If the result of the determining at block 908 is yes, then SONF 112 may conclude that a load balancing is needed/desired (block 950). Otherwise (block 908: NO), process 900 may proceed to block 910. For example, SONF 112 may determine whether the LBR for 850 MHz band is greater than 15% and the unused throughput for 700 MHz band is greater than the unused throughput for 850 MHz band plus 3 Mbps.

At block 910, SONF 112 may determine whether LBR3 is less than or equal to −γ% and UTP3 is greater than UTP4 plus TM (block 910). If the result of the determining at block 910 is yes, then SONF 112 may conclude that a load balancing is needed/desired (block 950). Otherwise (block 910: NO), process 900 may proceed to block 912. For example, SONF 112 may determine whether the LBR for 700 MHz band is less than −15% and the unused throughput for 700 MHz band is greater than the unused throughput for 850 MHz band plus 3 Mbps.

At block 912, SONF 112 may determine whether LBR4 is less than or equal to −γ% and UTP4 is greater than UTP3 plus TM (block 912). If the result of the determining at block 912 is yes, then SONF 112 may conclude that a load balancing is needed/desired (block 950). Otherwise (block 912: NO), process 900 may proceed to block 914. For example, SONF 112 may determine whether the LBR for 850 MHz is less than −15% and the unused throughput for 850 MHz is greater than the unused throughput for 700 MHz band plus 3 Mbps.

At block 914 (FIG. 9B), SONF 112 may determine whether LBR5 is greater than or equal to γ% and UTP of particular bands (e.g., any band excluding AWS-3 (1695-1710 MHz)) is greater than UTP5 plus TM (block 914). If the result of the determining at block 914 is yes, then SONF 112 may conclude that a load balancing is needed/desired (block 950). Otherwise (block 914: NO), process 900 may proceed to block 916. For example, SONF 112 may determine whether the LBR for PCS band is greater than 15% and the unused throughput for any band excluding AWS-3 is greater than the UTP5 plus 3 Mbps.

At block 916, SONF 112 may determine whether LBR6 is greater than or equal to γ% and the UTP of particular bands (e.g., any band excluding AWS-3) greater than UTP6 plus TM (block 916). If the result of the determining at block 916 is yes, then SONF 112 may conclude that a load balancing is needed/desired (block 950). Otherwise (block 916: NO), process 900 may proceed to block 918. For example, SONF 112 may determine whether the LBR for the AWS band is greater than or equal to 15% and the unused throughput for any band excluding AWS-3 is greater than the unused throughput for other AWS band plus 3 Mbps.

At block 918, SONF 112 may determine whether LBR5 is less than or equal to −γ% and the UTP6 is greater than UTP5 plus TM (block 918). If the result of the determining at block 918 is yes, then SONF 112 may conclude that a load balancing is needed/desired (block 950). Otherwise (block 918: NO), process 900 may proceed to block 920. For example, SONF 112 may determine whether the LBR for the PCS band is less than −15% and the unused throughput for the AWS band is greater than the unused throughput for the PCS band plus 3 Mbps.

At block 920, SONF 112 may determine whether LBR6 is less than or equal to −γ% and UTP5 is greater than UTP6 plus TM (block 920). If the result of the determining at block 920 is yes, then SONF 112 may conclude that a load balancing is needed/desired (block 950). Otherwise (block 920: NO), process 900 may proceed to block 952, for SONF 112 to conclude that no load balancing is needed or desired at the site. For example, SONF 112 may determine whether the LBR for the AWS band is less than −15% and the unused throughput for the PCS band is less than the unused throughput for the AWS band plus 3 Mbps.

In this specification, various preferred embodiments have been described with reference to the accompanying drawings. Modifications may be made thereto, and additional embodiments may be implemented, without departing from the broader scope of the invention as set forth in the claims that follow. The specification and drawings are accordingly to be regarded in an illustrative rather than restrictive sense.

While a series of blocks have been described above with regard to the processes illustrated in FIGS. 8A-9B, the order of the blocks may be modified in other implementations. In addition, non-dependent blocks may represent blocks that can be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

To the extent the aforementioned embodiments collect, store or employ personal information provided by individuals, it should be understood that such information shall be collected, stored, and used in accordance with all applicable laws concerning protection of personal information. The collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, block, or instruction used in the present application should be construed as critical or essential to the implementations described herein unless explicitly described as such. Also, as used herein, the articles "a," "an," and "the" are intended to include one or more items. Further, the phrase "based on" is intended to mean "based, at least in part, on" unless explicitly stated otherwise.

What is claimed is:

1. A device comprising:
 a processor to execute instructions to:
  determine load balancing ratios and unused throughputs for a first frequency band and a second frequency band for a cell site;
  determine whether a load balancing procedure for the cell site should be performed to increase a traffic throughput at the cell site, by determining that a load balancing ratio for a sub-band is less than a threshold value and an unused throughput for the sub-band is greater than an unused throughput for any other sub-bands plus a margin throughput; and
  when the processor determines that the load balancing procedure should be performed, perform the load balancing procedure.

2. The device of claim 1, wherein when the processor performs the load balancing procedure, the processor is configured to:
 instruct a wireless station at the cell site to up tilt an antenna that transmits in the first frequency band.

3. The device of claim 1, wherein when the processor performs the load balancing procedure, the processor is configured to:

instruct a wireless station at the cell site to increase or lower a threshold for a minimum receive power at which a user device can maintain a communication link to the wireless station, to cause a number of user devices to terminate their communication links, established through the first frequency band, to the wireless station and establish new communication links through the second frequency band, to the wireless station.

4. The device of claim 1, wherein when the processor performs the load balancing procedure, the processor is configured to:
send a notification, to a network operator, indicating that:
an unused spectrum is available for allocation at a wireless station; or
one or more advanced antennas are to be installed at the wireless station for communication at the first frequency band.

5. The device of claim 1, wherein the first frequency band includes a Personal Communication Services band and an Advanced Wireless Services band.

6. The device of claim 1, wherein when the processor determines whether the load balancing procedure should be performed, the processor is configured to:
determine whether a traffic volume through the first frequency band is greater than a traffic volume through the second frequency band plus a margin traffic volume.

7. The device of claim 1, wherein when the processor determines the load balancing ratios and the unused throughput for the first frequency band and the second frequency band for the cell site, the processor is configured to:
calculate an unused throughput by multiplying a number of empty physical resource blocks (PRBs) by Media Access Code (MAC) bits per PRB, wherein the number of empty PRBs is equal to a number of available PRBs times a result of a difference between one and a percent of PRBs used,
wherein the MAC bits per PRB is equal to a number of MAC bits divided by a number of PRBs used.

8. The device of claim 1, wherein when the processor determines the load balancing ratios and the unused throughput for the first frequency band and the second frequency band for the cell site, the processor is configured to:
determine a load balancing ratio of a sub-band, of the first frequency band, as a difference of a device time using the sub-band band and a ratio of a bandwidth of the sub-band to a sum of bandwidths of all available sub-bands in the first frequency band.

9. A method comprising:
determining load balancing ratios and unused throughputs for a first frequency band and a second frequency band for a cell site;
determining whether a load balancing procedure for the cell site should be performed to increase a traffic throughput at the cell site, by determining that a load balancing ratio for a sub-band is less than a threshold value and an unused throughput for the sub-band is greater than an unused throughput for any other sub-bands plus a margin throughput; and
performing the load balancing procedure when it is determined that that the load balancing procedure should be performed for the cell site.

10. The method of claim 9, wherein when performing the load balancing procedure includes:
instructing a wireless station at the cell site to up tilt an antenna that transmits in the first frequency band.

11. The method of claim 9, wherein performing the load balancing procedure includes:
instructing a wireless station at the cell site to increase or lower a threshold for a minimum receive power at which a user device can maintain a communication link to the wireless station, to cause a number of user devices to terminate their communication links, established through the first frequency band, to the wireless station and establish new communication links through the second frequency band, to the wireless station.

12. The method of claim 9, wherein performing the load balancing procedure includes:
sending a notification, to a network operator, which indicates that:
an unused spectrum is available for allocation at a wireless station; or
one or more advanced antennas are to be installed at the wireless station for communication at the first frequency band.

13. The method of claim 9, wherein the first frequency band includes Personal Communication Services band and Advanced Wireless Services band.

14. The method of claim 9, wherein determining whether the load balancing procedure should be performed includes:
determining whether a traffic volume through the first frequency band is greater than a traffic volume through the second frequency band plus a margin traffic volume.

15. The method of claim 9, wherein determining the load balancing ratios and the unused throughput for the first frequency band and the second frequency band for the cell site includes:
calculating an unused throughput by multiplying a number of empty physical resource blocks (PRBs) by Media Access Code (MAC) bits per PRB, wherein the number of empty PRBs is equal to a number of available PRBs times a result of a difference between one and a percent of PRBs used,
wherein the MAC bits per PRB is equal to a number of MAC bits divided by a number of PRBs used.

16. The method of claim 9, wherein determining the load balancing ratios and the unused throughput for the first frequency band and the second frequency band for the cell site includes:
determining an LBR of a sub-band, of the first frequency band, as a difference of a device time using the sub-band band and a ratio of a bandwidth of the sub-band to a sum of bandwidths of all available sub-bands in the first frequency band.

17. A non-transitory computer-readable medium comprising a processor-executable instructions that, when executed by a processor, cause the processor to:
determine load balancing ratios and unused throughputs for a first frequency band and a second frequency band for a cell site;
determine whether a load balancing procedure for the cell site should be performed to increase a traffic throughput at the cell site, by determining that a load balancing ratio for a sub-band is less than a threshold value and an unused throughput for the sub-band is greater than an unused throughput for any other sub-bands plus a margin throughput, and
when the processor determines that the load balancing procedure should be performed, perform the load balancing procedure.

18. The non-transitory computer-readable medium of claim 17, wherein when the processor performs the load balancing procedure, the processor is configured to:
instruct a wireless station at the cell site to up tilt an antenna that transmits in the first frequency band.

19. A device comprising:
a processor to execute instructions to:
determine load balancing ratios and unused throughputs for a first frequency band and a second frequency band for a cell site;
determine whether a load balancing procedure for the cell site should be performed to increase a traffic throughput at the cell site; and
when the processor determines that the load balancing procedure should be performed, instruct a wireless station at the cell site to increase or lower a threshold for a minimum receive power at which a user device can maintain a communication link to the wireless station, to cause a number of user devices to terminate their communication links, established through the first frequency band, to the wireless station and establish new communication links through the second frequency band, to the wireless station.

20. The device of claim 19, wherein when the processor performs the load balancing procedure, the processor is configured to:
instruct a wireless station at the cell site to up tilt an antenna that transmits in the first frequency band.

21. The device of claim 19, wherein when the processor performs the load balancing procedure, the processor is configured to:
send a notification, to a network operator, indicating that:
an unused spectrum is available for allocation at a wireless station; or
one or more advanced antennas are to be installed at the wireless station for communication at the first frequency band.

* * * * *